(12) United States Patent
Boeck

(10) Patent No.: US 6,817,189 B2
(45) Date of Patent: Nov. 16, 2004

(54) ARRANGEMENT FOR THE COOLING OF THE CASING OF AN AIRCRAFT GAS TURBINE ENGINE

(75) Inventor: Alexander Boeck, Köttgeisering (DE)

(73) Assignee: Rolls-Royce Deutschland Ltd & Co KG, Dahlewitz (DE)

( * ) Notice: Subject to any disclaimer, the term of this patent is extended or adjusted under 35 U.S.C. 154(b) by 0 days.

(21) Appl. No.: 09/942,934

(22) Filed: Aug. 31, 2001

(65) Prior Publication Data

US 2003/0233834 A1 Dec. 25, 2003

(30) Foreign Application Priority Data

Aug. 31, 2000 (DE) .......................................... 100 42 933

(51) Int. Cl.[7] .............................................. F02C 7/18
(52) U.S. Cl. ........................................... 60/785; 60/806
(58) Field of Search ............................. 60/226.1, 226.3, 60/785, 806; 415/115

(56) References Cited

U.S. PATENT DOCUMENTS

| 3,361,348 A | | 1/1968 | Salerno |
| 4,163,366 A | | 8/1979 | Kent |
| 4,474,001 A | | 10/1984 | Griffin |
| 5,038,560 A | | 8/1991 | Seed |
| 5,351,732 A | * | 10/1994 | Mills et al. .................. 415/115 |
| 5,845,482 A | * | 12/1998 | Carscallen ................... 60/785 |
| 6,035,627 A | * | 3/2000 | Liu .............................. 60/785 |

FOREIGN PATENT DOCUMENTS

GB          1006342          12/1962

* cited by examiner

Primary Examiner—Louis J. Casaregola
(74) Attorney, Agent, or Firm—Harbin King & Klima

(57) ABSTRACT

This invention relates to an arrangement for the cooling of the casing 1 of an aircraft gas turbine with a bypass duct 2 and at least one cooling air tube 3, this cooling air tube 3 having its inlet 4 arranged in the bypass duct 2 and entering at least one cooling air chamber 5 for the supply of cooling air to the casing 1, characterized in that a movable air deflector 6 is arranged in the bypass duct 2 upstream of the inlet 4 of the cooling air tube 3.

14 Claims, 1 Drawing Sheet

ARRANGEMENT FOR THE COOLING OF THE CASING OF AN AIRCRAFT GAS TURBINE ENGINE

Figure 1:
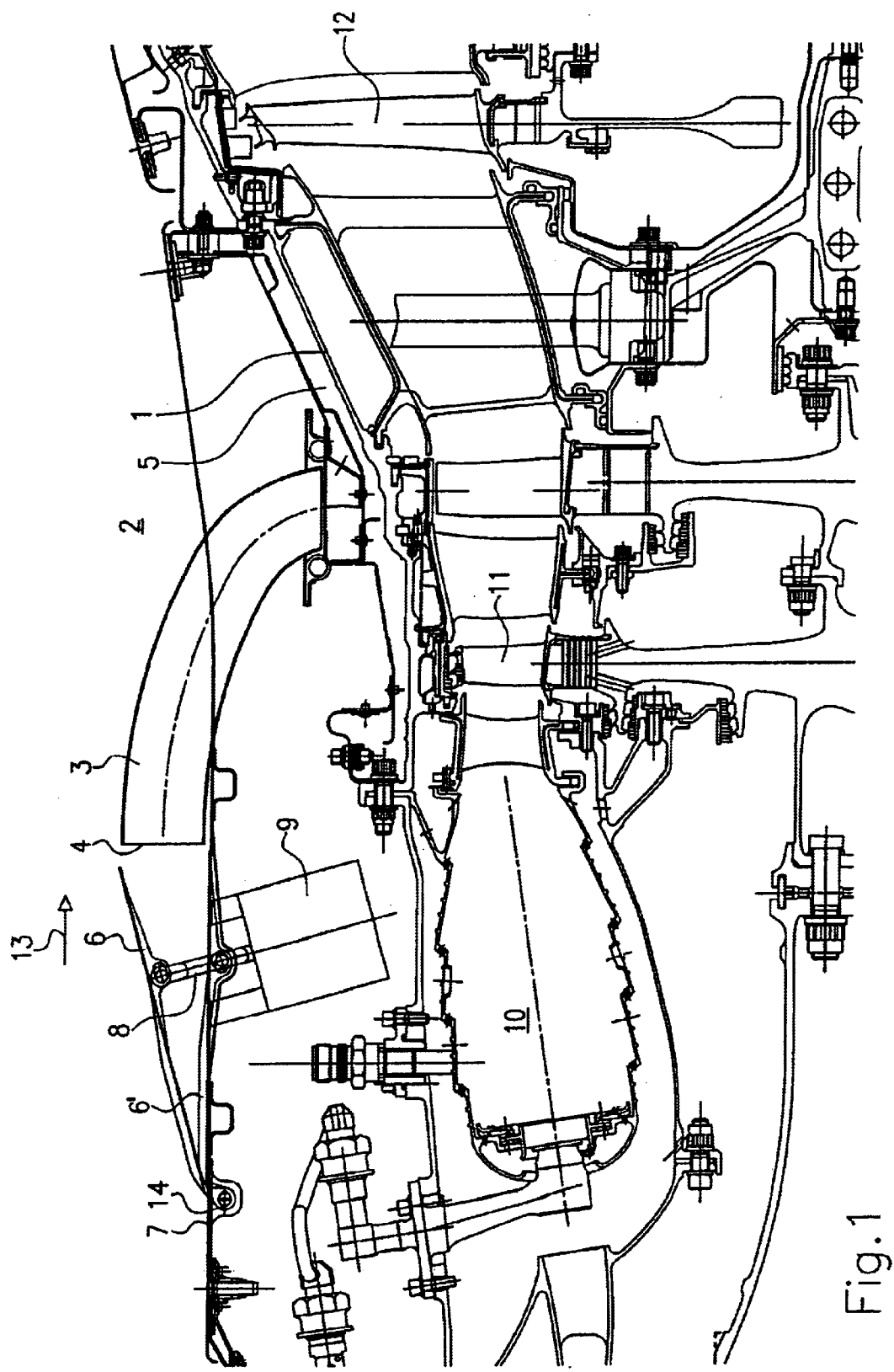

This application claims priority to German Patent Application No 10042933.5, filed Aug. 31, 2000, the contents of which are incorporated by reference herein.

This invention relates to an arrangement for the cooling of the casing of an aircraft gas turbine. More particularly, this invention relates to an arrangement for the cooling of the casing of an aircraft gas turbine with a bypass duct and at least one cooling air tube, this cooling air tube having its inlet arranged in the bypass duct and entering at least one cooling air chamber for the supply of cooling air to the casing.

In the prior art, a large one-stage fan is provided on bypass gas turbine engines which delivers one portion of the air flow through the core engine and another portion, the bypass, through a closed annular duct (bypass duct). For the purpose of clearance control on a high-pressure turbine or a low-pressure turbine, means are known in the state of the art which provide for appropriate cooling of the casings, thereby minimizing the Up clearances and avoiding flow losses at the blade tips.

To enable the cooling of the casing, i.e. the tip clearance, to be adapted to the prevailing operating conditions of the engine, suitable means must be provided for the control of the cooling air flow. In particular with engine designs in which the cooling air flow is driven by only the dynamic pressure in the bypass duct, the implementation of appropriate means for the control of the cooling air flow may incur a considerable technical investment. The control of flow in the bypass duct itself would necessitate relatively large control elements or valves which would impair the flow-through and the efficiency of the bypass duct.

In a broad aspect, the present invention provides an arrangement of the type specified at the beginning which combines simplicity of design, cost-effective manufacture as well as simplicity and safety of operation with the capability of controlled cooling of the casing of a turbine.

It is a particular object of the present invention to provide a gas turbine having a cooling air tube having an inlet in an air bypass duct and an outlet connected to a cooling air chamber for supplying cooling air from the air bypass duct to a casing of the turbine, with an air deflector positioned in the bypass duct upstream of the cooling air tube inlet, the air deflector being movable to deflect air from the cooling air tube inlet. Further objects and advantages of the invention will be apparent from the description below.

In accordance with the present invention, a movable air deflector is provided in the bypass duct upstream of the inlet of the cooling air tube.

The present invention is characterized by a variety of merits.

Installing an air deflector upstream of the inlet of the cooling air tube enables the air flow in the bypass duct to be influenced to the effect that it either enters the cooling air tube without disturbance or that it is either completely or partly passed by the inlet of the cooling air tube. The air deflector in accordance with the present invention is very easily implementable and will impair the flow in the bypass duct only insignificantly. This arrangement provides an effective means for controlling the inflow of cooling air into the cooling air tube.

In accordance with the present invention, the air deflector influences the effective inlet area of the cooling air tube. This will control the inflow of the cooling air into the cooling air tube and, consequently, the cooling effect applied to the casing of the turbine.

In a particularly favorable development of the present invention, the air deflector is movable between an open position in which the inlet of the cooling air tube is completely exposed to the air flow, and a closed position in which the inlet of the cooling air tube is isolated from the air flow. This arrangement enables the effective inlet area of the cooling air tube to be varied infinitely.

The air deflector is preferably designed as a flap which is movably supported at its forward end. This design provides for appropriate mechanical location of the forward, upstream end of the flap-type deflector. Owing to the shape of the air deflector, the pressure forces exerted by the cooling air flow in the bypass duct will essentially be confined to the air deflector. In a particularly favorable arrangement, the air deflector extends essentially in the direction of the air flow in the bypass duct, enabling the air deflector to make an acute angle between its closed and its open position. The rearward end of the air deflector is preferably located near the inlet of the cooling air tube to avoid undesired swirl or similar effects.

Obviously, the air deflector may have a plurality of geometrical shapes; it may be plate-shaped or spherically curved to optimally match with the inlet section of the cooling air tube.

In a further advantageous arrangement, the air deflector is flat against the inner wall of the bypass duct when it is in the open position. For this purpose, the inner wall of the bypass duct may be recessed to partly or fully contain the air deflector, thereby optimizing it aerodynamically.

The air deflector is preferably set by an actuating rod which is connected to an actuating unit. The actuating unit may be a positioning motor. This provides for a very simple and effective means for swiveling the air deflector.

The invention is more fully described in the light of the accompanying drawing showing an embodiment of the present invention. On the drawing:

FIG. 1 is a simplified section of a partial area of an aircraft gas turbine showing a simplified representation of a combustion chamber, a high-pressure turbine and a low-pressure turbine as well as the cooling air tube and the air deflector in accordance with the present invention.

FIG. 1 illustrates a partial area of an aircraft gas turbine engine in longitudinal section. The aircraft gas turbine engine comprises a combustion chamber 10, a downstream high-pressure turbine 11 and a low-pressure turbine 12. The turbines 11 and 12 are located within a casing 1 which is embraced by an essentially annular cooling air chamber 5. Entering the cooling air chamber 5 is a cooling air tube 3 whose inlet 4 is arranged within a bypass duct 2 into which the bypass air is delivered by a fan, as indicated by the arrowhead 13. Accordingly, the bypass air entering the inlet 4 is ducted via the cooling air tube 3 into the cooling air chamber 5. The cooling air chamber 5 may be divided into individual sub-chambers to ensure that the casing 1 of the turbine is cooled by the cooling air to best effect.

In accordance with the present invention, an air deflector 6 is pivotally located upstream of the inlet 4 of the cooling air tube 3. The upstream end of the air deflector 6 is located on the inner wall 7 of the bypass duct 2 by means of a hinge 14. Furthermore, an actuating rod 8 is linked to the air deflector 6, this actuating rod 8 being connected to an actuating unit 9 (positioning motor or similar device).

FIG. 1 shows the closed position of the air deflector 6 in which the inlet 4 of the cooling air tube 3 is essentially isolated from the airflow. The lower, open position of the air deflector 6 in which the inlet 4 is fully exposed to the air flow in the bypass duct 2 is indicated by reference numeral 6'. The inner wall 7 may be recessed to contain the air deflector 6 in its open position at least partly, thereby reducing the flow resistance.

Generally, a plurality of modifications may be made to the embodiment shown without departing from the inventive concept expressed.

Summarizing, then, the present invention relates to an arrangement for the cooling of the casing 1 of an aircraft gas turbine with a bypass duct 2 and at least one cooling air tube 3, whose inlet 4 is arranged within the bypass duct 2 and which enters at least one cooling air chamber 5 for the supply of cooling air to the casing 1, characterized in that a movable air deflector 6 is arranged in the bypass duct 2 upstream of the inlet 4 of the cooling air tube 3.

LIST OF REFERENCE NUMERALS

1 Casing
2 Bypass duct
3 Cooling air tube
4 Inlet of 3
5 Cooling air chamber
6 Air deflector
7 Inner wall of 2
8 Actuating rod
9 Actuating unit
10 Combustion chamber
11 High-pressure turbine
12 Low-pressure turbine
13 Bypass air flow
14 Hinge

What is claimed is:

1. A system for cooling a gas turbine, comprising:
an air bypass duct;
at least one cooling air chamber for supplying cooling air to a casing of the gas turbine;
at least one cooling air tube having an inlet positioned in the air bypass duct and an outlet connected to the cooling air chamber to supply cooling air from the air bypass duct to the cooling air chamber; and
an air deflector positioned in the air bypass duct upstream of the cooling air tube inlet, the air deflector being movable to deflect air from the cooling air tube inlet.

2. The system of claim 1, wherein:
the air deflector is movable between an open position in which the cooling air tube inlet is substantially fully exposed to air flow in the air bypass duct and a closed position in which the cooling air tube inlet is substantially isolated from air flow in the air bypass duct.

3. The system of claim 2, wherein:
the air deflector comprises a flap having an upstream end, the flap upstream end being pivotally mountable to the gas turbine.

4. The system of claim 3, wherein:
the air deflector extends substantially in a direction of the air flow in the bypass duct.

5. The system of claim 4, wherein:
an inner wall of the air bypass duct is recessed to at least partially contain the air deflector when the air deflector is in the closed position.

6. The system of claim 5, wherein:
the air deflector makes an acute angle with the inner wall of the air bypass duct when in the closed position.

7. The system of claim 6, and further comprising:
a deflector actuating unit; and
an actuating rod connecting the deflector actuating unit to the deflector.

8. The system of claim 7, wherein:
the deflector actuating unit comprises a positioning motor.

9. The system of claim 1, wherein:
the air deflector comprises a flap having an upstream end, the flap upstream end being pivotally mountable to the gas turbine.

10. The system of claim 1, wherein:
the air deflector extends substantially in a direction of air flow in the bypass duct.

11. The system of claim 1, wherein:
an inner wall of the air bypass duct is recessed to at least partially contain the air deflector when the air deflector is in a closed position.

12. The system of claim 1, and further comprising:
a deflector actuating unit; and
an actuating rod connecting the deflector actuating unit to the deflector.

13. The system of claim 2, wherein:
the air deflector makes an acute angle with an inner wall of the air bypass duct when in the closed position.

14. A gas turbine, comprising:
a combustion chamber;
a casing;
a high pressure turbine positioned within the casing;
a low pressure turbine positioned within the casing downstream of the high pressure turbine;
an air bypass duct;
at least one cooling air chamber for supplying cooling air to the casing of the gas turbine;
at least one cooling air tube having an inlet positioned in the air bypass duct and an outlet connected to the cooling air chamber to supply cooling air from the air bypass duct to the cooling air chamber; and
an air deflector positioned in the air bypass duct upstream of the cooling air tube inlet, the air deflector being movable between a first position and a second position, the first position exposing a portion of the cooling air tube inlet to air flow in the air bypass duct, the second position isolating that portion of the air tube inlet from the air flow in the air bypass duct.

* * * * *